June 19, 1962  F. MISCHE  3,039,352
BASE RANGE FINDER WITH ADJUSTABLE ABAT WEDGE
Filed July 16, 1958  2 Sheets-Sheet 1
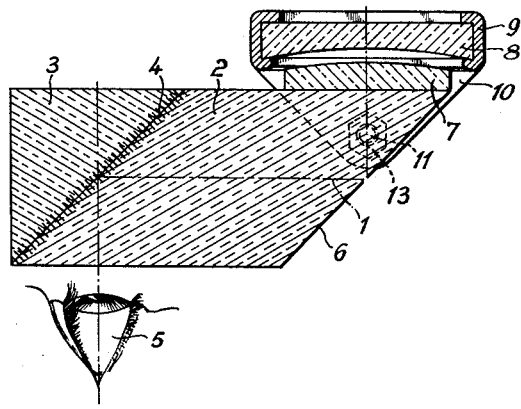
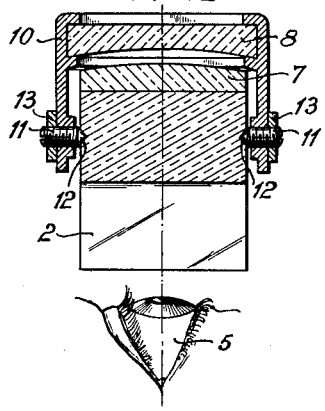
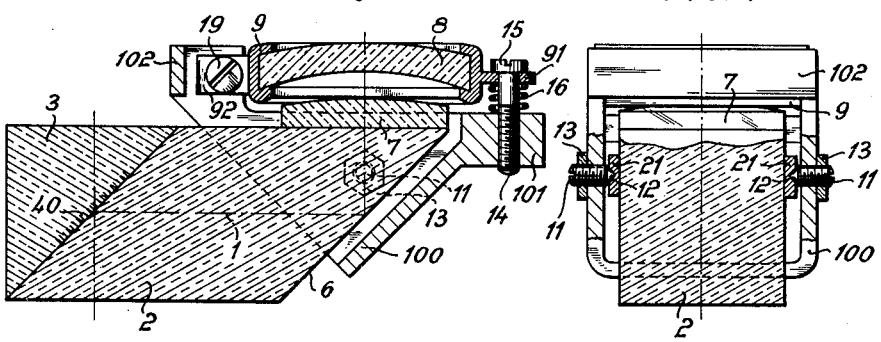
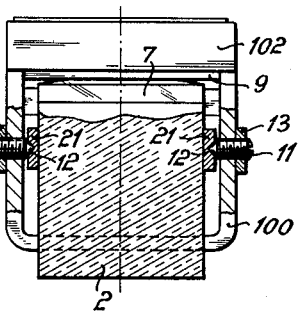
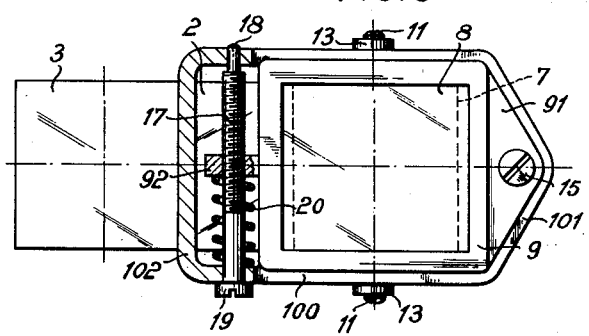
INVENTOR
Friedrich Mische
By: Mack-Blum
ATTORNEYS June 19, 1962 F. MISCHE 3,039,352
BASE RANGE FINDER WITH ADJUSTABLE ABAT WEDGE
Filed July 16, 1958 2 Sheets-Sheet 2

INVENTOR
Friedrich Mische
BY: Mayer Blum
ATTORNEYS

United States Patent Office 3,039,352
Patented June 19, 1962

3,039,352
BASE RANGE FINDER WITH ADJUSTABLE ABAT WEDGE
Friedrich Mische, Braunschweig, Germany, assignor to Voigtlander A.G., Braunschweig, Germany, a corporation of Germany
Filed July 16, 1958, Ser. No. 748,979
Claims priority, application Germany Sept. 28, 1957
7 Claims. (Cl. 88—2.4)

This invention relates to photographic range finders and it has particular relation to base range finders for photographic cameras.

It has been known to use photographic range finders, in which the entire base extends in glass. Such glass base may consist of a glass rod or of prisms. If, in special cases, the range finder requires optical members, the latter may be built-in in the glass body, cemented to it between the two end mirrors, or united with it in any other suitable manner to form a common glass body.

It has been likewise suggested to use the glass body as a mechanical guide means for the movable element of the range finder. According to this suggestion (see German Patent No. 746,756), in range finders using the well-known Abat wedge, the glass member through which the base of the range finder extends has fixedly connected to it the positive lens of the Abat wedge, while the movable lens of the Abat wedge has a curved surface in sliding engagement with the mating curved surface of the fixed lens so that it is guided by the latter. Such structure of a range finder has various advantages. However, it has the disadvantage that, in the adjustment of the range finder two glass surfaces must glide one upon another and this often results in scratches in the surfaces. Moreover, in this arrangement it is difficult to guide spherical surfaced lenses one upon another and to control their movement. In order to render it possible to guide the beforementioned tiltable lens with an exactness sufficient for the range finder, it would be necessary to design such lens, as well as the counter-lens serving as its support, as a cylindrical body. It is well known that the manufacture of cylindrical lenses is difficult and expensive, so that the practical use of this principle is barred.

Furthermore, in the beforementioned range finder construction it was hitherto customary to arrange the tiltable lens separately from the other parts of the range finder. Thereby, however, it may easily happen that adjustment of the tiltable lens relative to the remainder of the range finder, is adversely affected.

It is an object of the present invention to provide a range finder which can be used as a measuring finder and in which the above described difficulties are avoided. As a starting point according to this invention a range finder is used in which the entire base consists of glass. An Abat wedge of the known type is mounted on the base. This has the object to eliminate, on the one hand, the danger of scratch formation, inaccurate guiding, and adverse effects on adjustment, and, on the other hand, to eliminate the necessity of using a cylindrical lens.

The above is attained, according to the present invention, by guiding the tiltable lens for swinging movement at a finite distance from the positive lens of the Abat wedge and holding it in a pivoted or swingable mount, the pivotal axis of which is located on the range finder proper, i.e. on the glass member forming the base of the range finder.

In order to provide for guiding of the tiltable lens at a distance from the other lens of the wedge (which is fastened on the glass block) in such a manner that the wedge meets the optical conditions of range finding measurements, it is further contemplated, according to the present invention, to establish a definite relation between the two lenses, whereby the two lenses have equal focal lengths, so that their principal points coincide.

However, if the two lenses of the Abat wedge are at a finite air distance from each other, the focal lengths of these two lenses will differ by the air distance. Due to this, a decrease in the path of rays of the range finder would occur, relative to the path of rays of the finder. In order to compensate for this decrease, according to the invention one or both of the two lenses of the Abat wedge are designed as menisci.

Advantageously, the pivoted or tiltable lens of the Abat wedge is mounted for adjustment in directions parallel to its pivotal axis and at right angles to its pivotal axis. Suitable adjusting means are provided to effect this.

According to a further feature of the present invention, the bearing means for the tiltable lens, which bearing means is arranged in the glass block forming the base of the range finder, is designed as a jeweled bearing. In this connection, it has been found to be of advantage to apply, to the glass block, jewels which are, for example, similar to those used in watches.

For an understanding of the principles of the invention, reference is made to the following description of typical embodiments thereof as illustrated in the accompanying drawings. In the drawings:

FIG. 1 is a horizontal sectional view through a range finder embodying the invention;

FIG. 2 is a vertical sectional view through the range finder of FIG. 1, the section being taken through the pivotal axis of the movable member of the Abat wedge;

FIG. 3 is a horizontal sectional view through another embodiment of range finder incorporating the invention;

FIG. 4 is a vertical sectional view through the range finder of FIG. 3, again taken on the pivotal axis of the movable lens member of the Abat wedge;

FIG. 5 is a front elevational view, partly in section, of the embodiment of the range finder shown in FIGS. 3 and 4.

Figure 6:
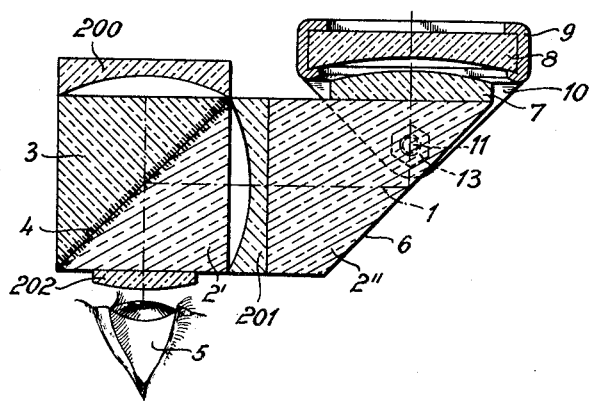
FIG. 6 is a horizontal sectional view through a further embodiment of the invention.

Referring now to the drawings in detail, in FIG. 1 the base 1 of the range finder extends longitudinally of a prism 2 to which a further prism 3 is cemented. A partially permeable mirror 4 is arranged in the cemented interface of prisms 2 and 3. Thus, the eye 5 observes the object directly along a line of sight extending through the partially permeable mirror 4 and also along a line of sight extending to the partially permeable mirror 4 and then at right angles to the normal axis of viewing extending from the eye, along the base line 1, to the inclined surface 6 of prism 2, from whence this second line of sight extends to the object. The lenses 7 and 8 form the Abat wedge, lens 7 being fixedly cemented to glass prism 2, while lens 8 is tiltable for measurement of the distance. In order to attain this, mount 9 of lens 8 is connected with a carrier body 10, which is pivotally mounted at 11 on prism 2. As shown in FIG. 2, for this purpose, pivot studs 11 are threaded through body 10 so that their points 12 have bearing engagement in the prism 2, lock nuts 13 being provided for the pivot studs 11.

Range finders of the construction shown in FIGS. 1 and 2, have the particular advantage that tiltable lens 8 is swingable about a fixed axis 11 relative to prism 2, and thus also to base 1 of the range finder, and due to this a very accurate measurement of the distance is possible.

The embodiment illustrated in FIGS. 3, 4 and 5 is based on the same principle. In these figures equal or similar parts are denoted by identical reference symbols.

As can be seen from these figures, this embodiment provides for the possibility of adjusting lens 8 in a direction parallel to axis 11, as well as in a direction perpendicular to axis 11.

The structure of the measuring finder shown in FIG. 3 is substantially similar to that shown in FIG. 1. Based on the same principle, this structural form is capable of numerous variations. While in FIG. 1 the entire cemented interface between prisms 2 and 3 is formed as a partially permeable mirror 4, in the embodiment according to FIG. 3, only part of this interface is provided with a mirror 40, which is a full mirror. However, mirror 40 could be also a partially permeable mirror. In this embodiment, the carrier body for lens 8 and its mount 9 is of larger dimensions than in the embodiment shown in FIG. 1, and as indicated at 100.

The means for adjusting lens 8 in a direction perpendicular to its pivotal axis 11 comprises a screw 14 extending through a flange 91 of lens mount 9 and threaded into a flange 101 of carrier body 100. A spring 16 embraces screw 14 between flanges 91 and 101, and adjustment of screw 14 is effected by means of a tool applied to its head 15.

The adjustment of lens 18 parallel to its pivotal axis is effected in a similar manner. Referring more particularly to FIG. 5, a screw 17 has an unthreaded shank portion and an unthreaded tip portion 18 rotatably engaged in opposite sides of an upward extension 102 of carrier body 100. This screw has an operating head 19. Screw 17 is threaded through a flange or tab 92 on lens mount 9, and a compression spring 20 embraces the screw 17 between the tab 92 and the portion of part 102 engaged by the head 19 of the screw. Turning of screw 17 in either direction will adjust lens mount 9 and lens 8 in a direction parallel to pivotal axis 11.

In the construction illustrated in FIGS. 3–5 a further feature of the invention is incorporated. The points 12 of bolts 11 are not in direct contact with the glass body 2 but have their points 12 bearing in jewels 21 fastened to body 2.

In special cases, additional optical members can be built-in in the glass body of the range finder, according to the invention, or cemented to the glass body between the two end mirrors, to form a unitary construction.

FIGURE 6, which diagrammatically illustrates such an embodiment, shows a range finder which essentially corresponds in its structure to the embodiment shown in FIG. 1. However, by the insertion of a negative lens 200 and a positive lens 202 in the direct path of rays, and by the insertion of a lens 201—which is identical in its characteristics with lens 200—in the base of the range finder, a measuring finder having a reducing effect is provided. To receive lens 201, prism 2 has been divided into two prisms 2′ and 2″ and lens 201 and prisms 2′ and 2″ are joined to form a unitary structural member, for example by cementing. Lenses 200 and 202 can also be cemented to prisms 3 and 2′, respectively, and thus form integral parts of the structural unit including these two prisms, lens 201, prism 2″, and lens 7.

It will be understood from the above that this invention is not limited to the specific arrangements, designs, members and other details specifically described above and illustrated in the drawings and can be carried out with various modifications without departing from the scope of the invention as defined in the appended claims.

What is claimed is:

1. A coincidence type range finder for photographic cameras consisting of a body of transparent material forming the base of the range finder having a first pair of substantially parallel opposite side face surfaces facing, respectively, the object and the eye of the observer, and a pair of substantially parallel opposite end surfaces extending at an acute angle to said side surfaces and each facing a different one of said side face surfaces; the base portion of the optical axis of the range finder extending between said end surfaces and substantially parallel to said side surfaces, one of said end surfaces being partially reflecting and partially light transmitting, and the other end surface being fully reflective internally, whereby light rays entering through one side face surface at a zone adjacent said other end surface will be reflected by the latter through said body along the base of the range finder to such one end surface for reflection thereby through the other side face surface; a prism of transparent material having an oblique surface coextensive and contiguous with such one end surface, and a substantially planar surface coplanar with and forming an extension of such one side surface, said substantially planar prism surface forming an air-transparent material interface for entry of the direct image light rays, so that the eye of an observer, looking through such other side face surface in a direction perpendicular thereto, will receive a direct image of the object from light passing through said air-transparent material interface and an indirect image of the object from light reflected by said one end surface; an Abat wedge including a first lens cemented to said one side face surface and a second lens physically spaced a very short distance outwardly of said first lens for free movement relative thereto; a mounting bracket for said second lens including a pair of substantially parallel arms overlapping a second pair of substantially parallel opposite side face surfaces of said body and pivotally mounted directly on said second side face surfaces for pivotal adjustment of said second lens, about an axis extending across said body parallel to said end surfaces and parallel to said first side face surfaces, and spaced laterally from the base portion of the optical axis of the range finder, to bring said direct and indirect images into coincidence for measurement of the range by reference to the adjusted position of said second lens; a channel frame secured in said bracket and embracing said second lens; first cooperating means, including a first relatively elongated element extending transversely of the inner end of said bracket and a second element on the inner end of said frame pivotal on and adjustable longitudinally of said first element, pivotally mounting said frame in said bracket for adjustment about a second axis parallel to and spaced from said first-mentioned axis; an adjustment element rotatable in an extension on the outer end of said frame and fixed against axial movement therein, and adjustably engaged in an extension on the outer end of said bracket, and effective to adjust said frame about said second axis; said adjustment element forming a third axis for adjustment of said frame relatively to said bracket, the third axis being perpendicular to and spaced from said first-mentioned axis and said second axis; said first cooperating means effecting adjustment of said frame, relative to said bracket, about said third axis.

2. A coincidence type range finder as claimed in claim 1 in which the means for pivotally mounting said bracket directly on said body comprises a pair of axially spaced, opposing, and coaxial mounting studs threaded through the respective arms of said bracket embracing said body, and having pointed inner ends engaged in conical recesses in said second pair of opposite side surfaces of said body.

3. A coincidence type range finder as claimed in claim 1 in which the means pivotally mounting said bracket directly on said body comprises a pair of axially spaced, opposing, and coaxial mounting studs threaded through the respective arms of said bracket embracing said body and having pointed inner ends engaged in jewel bearings secured permanently on said second pair of opposite side surfaces of said body.

4. A coincidence type range finder as claimed in claim 1 in which said first and second lenses have equal focal lengths and coinciding principal points; at least one of said first and second lenses being a meniscus.

5. A coincidence type range finder as claimed in claim 1 including a first reducing lens incorporated integrally into said body between said two end surfaces and extending normal to the base of the range finder; and a second reducing lens, identical in optical properties with said first reducing lens, integrally secured to said substantially planar surface of said prism.

6. A coincidence type range finder as claimed in claim 1 in which said one end surface carries a partially light permeable mirror.

7. A coincidence type range finder as claimed in claim 1 in which said one end surface has a fully reflective mirror covering only a central area thereof and substantially centered on the base of the range finder.

References Cited in the file of this patent

UNITED STATES PATENTS

| | | |
|---|---|---|
| 1,338,985 | Hymans | May 4, 1920 |
| 2,037,513 | Kuppenbender | Apr. 4, 1936 |
| 2,108,751 | Kuppenbender | Feb. 15, 1938 |
| 2,330,694 | Estey et al. | Sept. 28, 1943 |

FOREIGN PATENTS

| | | |
|---|---|---|
| 16,123 | Great Britain | of 1895 |
| 746,756 | Germany | Aug. 23, 1944 |